J. E. THORNTON.
PHOTOGRAPHIC PRINTING PROCESS.
APPLICATION FILED JULY 8, 1919.
1,435,760.
Patented Nov. 14, 1922.
2 SHEETS—SHEET 2.
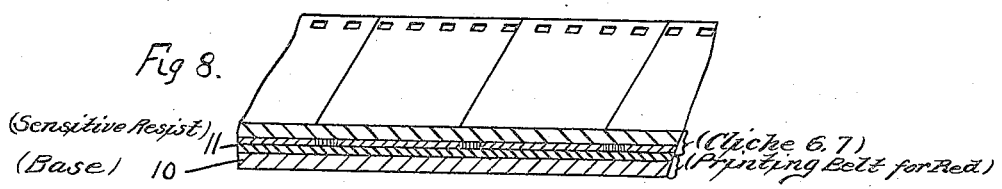
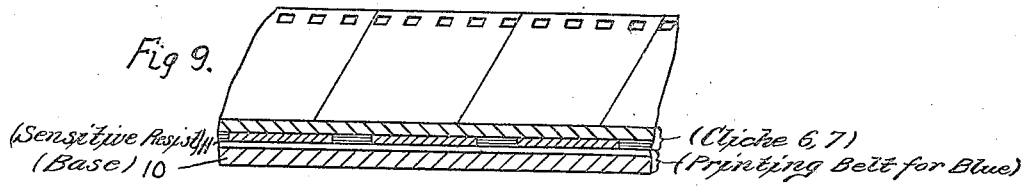
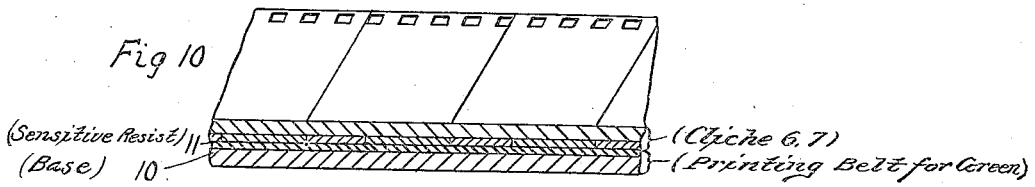
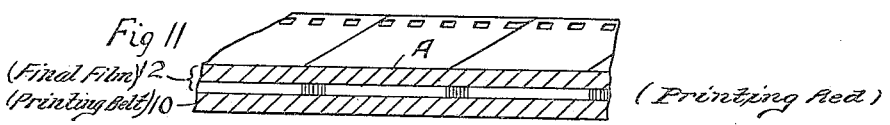
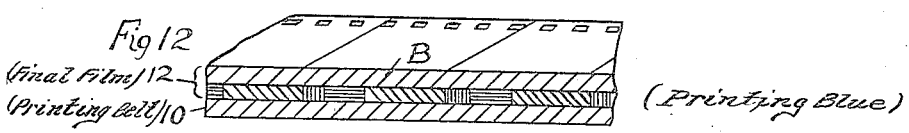
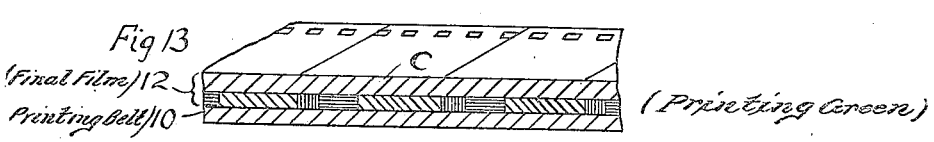
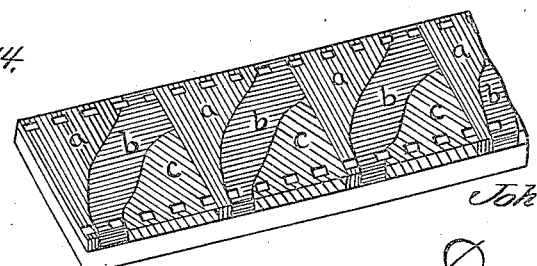
Inventor
John Edward Thornton
By _____
Attorney Patented Nov. 14, 1922.

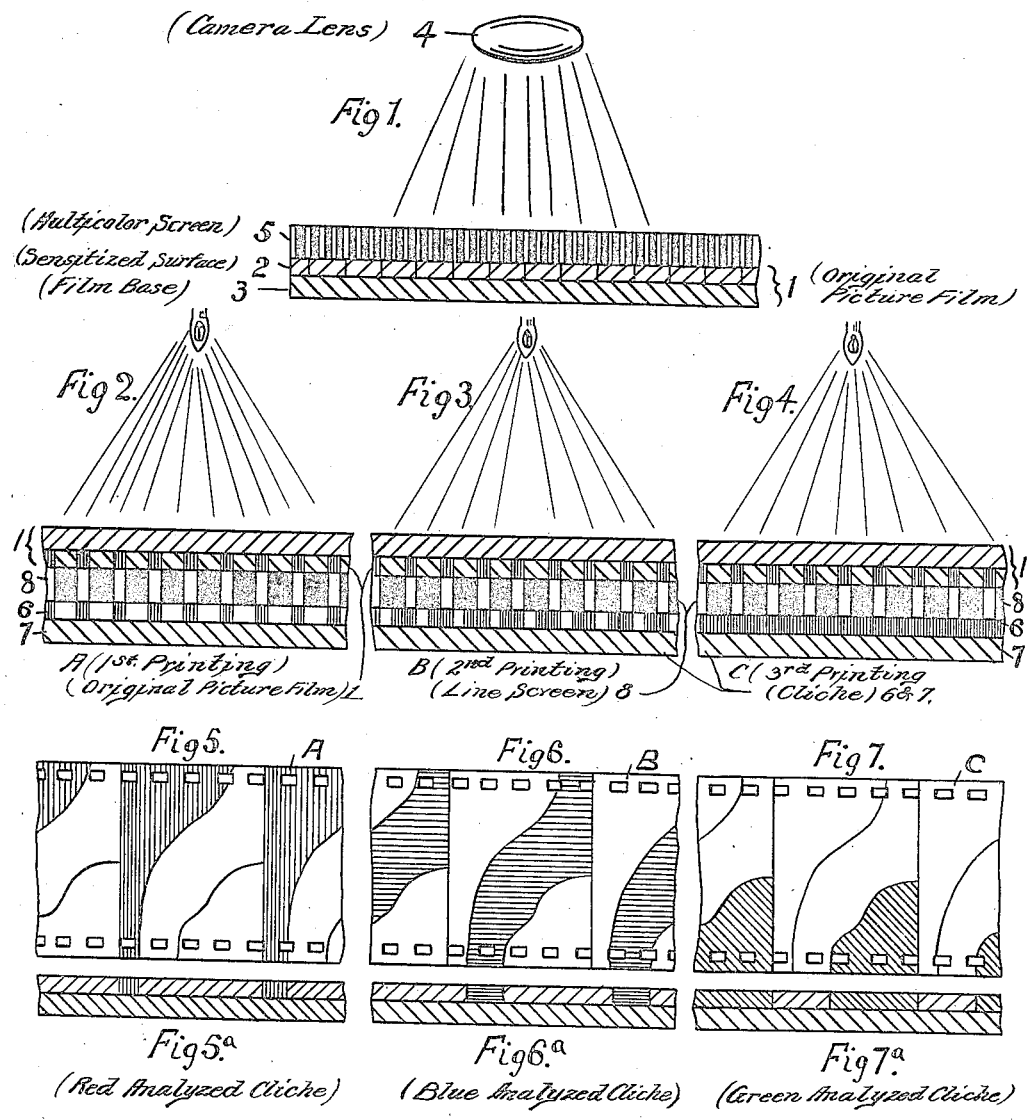

1,435,760

UNITED STATES PATENT OFFICE.

JOHN EDWARD THORNTON, OF WEST HAMPSTEAD, LONDON, ENGLAND, ASSIGNOR TO JOHN OWDEN O'BRIEN, OF MANCHESTER, ENGLAND.

PHOTOGRAPHIC-PRINTING PROCESS.

Original application filed March 21, 1916, Serial No. 85,702. Divided and this application filed July 8, 1919. Serial No. 309,429.

*To all whom it may concern:*

Be it known that I, JOHN EDWARD THORNTON, a British subject, residing at West Hampstead, London, England, have invented certain new and useful Improvements in and Relating to Photographic-Printing Processes, of which the following is a specification.

The invention relates to the production of multi-colour kinematograph films.

Its object is to provide a process for producing multi-colour or natural-colour heliochrome positive pictures in succession longitudinally of kinematograph films free from the objections of all other known methods which, generally, involve expensive and highly-skilled labour, defective registration, uneven colouring, or lack of transparency, and in some methods a great deal more film to produce them.

In order that the features of this invention and difference between this and other methods shall be clearly understood, I will first briefly describe the present state of the art.

Multi-colour or natural-colour kinematograph pictures for projection have been produced or suggested by the following methods.

*Colour systems dependent upon optical reconstruction of a divided image by projection. Multi-lens systems for multi-width films with side by side images.*

Two and three colour effects are obtained by exposing a double or triple width film in a special camera having two or three lenses, each fitted with a different colour filter, thus producing a set of colour-analyzed or section negatives in series on the film.

From this negative a monochrome (black and white) positive is printed upon film of similar width, the pictures being side by side, and the images are then caused to superimpose by projection upon a screen, through a similar optical apparatus of two or three lenses fitted with other similar colour filters, by which the section colour images are combined to form a reconstructed picture in colours upon the screen.

The objections to this system are that the positive requires much more film to produce it than a monochrome picture, twice as much for two-colour and three times for three-colour; and it cannot be shown in the ordinary monochrome projector, which is found in every picture theatre and takes only single width film, but requires instead a special projector. But the greatest objection of all is the one of parallax or lens-displacement. This necessitates the camera lenses being axially adjusted for objects in different planes, and therefore exact corresponding adjustment of the projection lenses during exhibition of the film.

*Multi-lens system for single-width films with images in succession.*

In some cases the taking and projecting lenses are placed one above the other instead of side by side. This enables a single-width film to be used, but otherwise the faults of parallax and large consumption of film remain. And although the film is only single width it requires to be moved proportionately faster, a two-colour film at double the monochrome speed and a three-colour film at three times the monochrome speed.

*Single-lens system with prisms or reflectors for multi- or single-width films.*

In other modifications of this system either prisms or reflectors or both in combination, together with colour screens, have been used to enable the primary image to be obtained from one standpoint through one lens, such primary image being then split up in the camera by prisms or reflectors or both, to form side by side colour-sectional images on the multi-width film, or one above the other on the multi-length single-width film.

Whilst this overcomes the defect of parallax, it involves great loss of light through the prisms or mirrors, and in the present state of knowledge it is exceedingly difficult or almost impossible to make a colour emulsion sufficiently rapid to enable ample exposure to be obtained in making the original or camera negatives.

*Single-lens system with alternating colour-analysis.*

To overcome these objections another system has been tried, known as the alternating principle. One example of this has attained considerable technical and commercial success under the name of kinemacolor, which is a two-colour system.

In this form the original or camera images are taken from one standpoint, by one lens, upon a single-width film, being split into two section-colour negatives or groups by means of moving colour filters (such as red and green) alternately passed before the lens. Thus one sectional picture negative is taken through the red filter and the next through the green, the same order being preserved throughout the length of film negative.

From this a monochrome positive is made, which is exhibited by means of a projector having correspondingly moving colour filters, and thus a series of red and green section images are projected upon the screen in rapid alternating succession, and the resulting image is a colour effect; not a complete superimposed-colour picture but two alternately projected colour images of red and green, which are combined in the eye of the observer by the law of persistence of vision as a complete coloured picture.

One objection to this system is the subject-displacement (movement). With stationary or slowly moving subjects this is not objectionable, but with rapidly moving subjects each phase of motion or each complete picture is represented as two parts in two different positions, producing an unsatisfactory and distressing picture upon projection.

The other objection to this system is the high speed of movement of the film—both in taking of the negative and in projection of the positive. For the negative it means that only half the exposure is obtainable, and for projection it means a greatly increased amount of light is necessary.

When this system is extended to three-colour these difficulties are still further increased and render it impracticable. This will be understood when it is pointed out that the exposure and projection speed for black and white film is 16 pictures per second; for the side-by-side two or three colour it is the same; and for the alternating system it is 32 per second for two-colour and 48 per second for three-colour.

The difficulties of taking 16 monochrome pictures per second are sufficiently considerable, especially in dull weather. For colour these difficulties are very much greater owing to the reduced light reaching the sensitive film through the colour filters, and also to the insensitiveness of film to some of the coloured rays, more particularly the red. It will therefore be obvious that any system which allows less exposure to be given, owing to necessary increase in film movement, means insufficient exposure except in cases of the most favourable conditions of light and subject.

*Colour system having all the colours self-contained in the film.*

All the foregoing difficulties are overcome by using a taking film for making the camera record constructed of the so-called multi-colour-screen type.

In this the film base is covered with a side-by-side colour filter, consisting of fine dots, grains, lines or mosaic pattern of different colours. This filter or screen may be for two-colour, three-colour or even more. Such multi-colour screen (or filter) is then coated with a panchromatic emulsion (that is, one sensitive to all coloured light rays).

The film is exposed in any ordinary single-width camera, at a speed of 16 pictures per second, the exposures being made with the film reversed so that the light passes first through the colour filter or screen before reaching the sensitive layer.

The film is developed in the ordinary way, subjected to a reversing bath, exposed to light, re-developed, fixed, washed, and dried, and thereupon yields a series of positives in colours. This is due to the fact that a negative image is produced upon the sensitive emulsion transparent in some places and opaque in others. This negative image acts as a cut-out or mask, allowing light to pass through the transparent (or negative) portions, and enabling sufficient of the colour dots to be seen to produce a positive image by transmitted light. The other coloured dots are blocked out by the photographic image or mask. From such a film reproductions can be similarly made for projection purposes.

One objection to this system is the great opacity of the finished picture film, which can only pass about 33 per cent. of the light because about 66 per cent. of its area is blocked out by the mask.

The other objection arises from the screen pattern or grain, which is painfully visible when the picture is highly magnified during projection.

For these last two reasons it has been found that the best forms of colour pictures for projection purposes are those produced by what is known as the "superimposed" method, in which the film is built up by printing in the several different colours, one upon another, from colour-section negatives that are taken by the multi-lens system or by the single-lens alternating system.

The advantages of such a film is its high degree of transparency owing to absence of cut-out mask, and freedom from grain or pattern owing to absence of multi-colour dot-screen.

The disadvantages are those arising from lens-displacement (parallax) in the multilens-system, and subject-displacement (movement) in the single-lens alternating system.

These disadvantages render the superimposed type of film as a product which does not realize everything to be desired.

It has further been proposed to take a screen-plate camera original film, reproduce therefrom three colour section negatives by photographing through subtractive colour filters on a triple width film, and finally producing from such negatives three positives in monochrome on a triple width film which are separately projected illuminated in colour and optically superimposed upon the viewing screen.

According to my invention I use the following features in combination:—

(1). A multi-colour screen type of film for making the original or camera pictures to obtain the three or other number of colours through one lens from the same point of view.

(2). A set of clichés comprising analyzed negative or positive reproductions made from such original—a separate one for each colour or shade—and all made of "full-tone" character (i. e. with the picture covering the whole area), by spreading the screen grain, dots, lines or other pattern during the process of reproduction.

(3). A superimposed type of film for the final positive for exhibition purposes, having the successive pictures thereon arranged longitudinally of the film on which three or other number of prints (free from the original screen pattern or grain) are superimposed—each in a different colour or shade—each being printed from a separate full-tone cliché by any suitable process.

The advantages secured as the result of this invention are as follows:—

*Exposure.*

The original or camera records are taken at 16 pictures per second, and therefore sufficient exposure is obtained under normal conditions of lighting, instead of being limited to abnormally favourable conditions. This is secured by using multi-colour-screen film for making the original records.

*Image displacement.*

The faults of lens displacement (parallax) and subject displacement (movement), which have hitherto been unavoidable when the positives were required to be of the highly-transparent superimposed-printed type, are abolished by using multi-colour-screen film for the original and transposing to the superimposed system for the final positive.

*Screen pattern.*

The faults of screen pattern in the original or camera record are eliminated from the final positive by the system of using intermediate clichés, from which the screen pattern is obliterated and a full-tone result secured.

*Transparency.*

The fault of low-transparency or opacity of image common to all multi-colour-screen systems and to the original camera pictures used in this invention consequent upon a light obscuring mask, is eliminated from the final positive by use of full-tone analyzed clichés and superimposed printing processes which enable the highest degree of transparency to be secured in the final positive.

*Range of colours.*

The faults and limitations of a two-colour or three-colour original are eliminated, and a much greater range with better tones and better gradation and truer colour rendering are obtained in the final positive than in the original by the system of preparing two or more different clichés of each colour, during the analysis, and printing from each cliché (directly or indirectly) in a different shade or tone of the original colour from which it was analyzed.

Incidentally other advantages are obtained, more particularly as to printing methods.

The printing processes hitherto known and employable are lengthy, expensive, and difficult to carry through upon a manufacturing scale. Among the best known methods by way of example, may be mentioned the following:—

The positive film is sensitized, printed, developed, and dyed for each different colour, the whole operations being repeated as many times as there are colours, for instance three times for a three-colour film.

The sensitive emulsion may be a gelatino-silver one, and the image after development is converted, by lengthy elaborate operations, into one formed of dye which replaces the silver. Or the silver image may with difficulty be toned to a colour approximating to the desired colour.

Or the sensitive medium may be bichromated gelatine, which is developed after printing by dyeing up, such process being known as the pinatype process.

Or the sensitive medium may be a bichromated gelatine emulsion containing the requisite colour, dye or pigment within itself before printing, known as the carbon process.

Some of these methods require about twenty-seven separate processes or operations to produce one three-colour print, and should any of them fail from defective manipulation the entire work is rendered useless. Moreover, many of them involve considerable personal labour and high degree of skill, and therefore cannot be done by machinery, so that the exact matching of colours and balancing of intensities by the printing and developing processes depends largely upon the personal equation for its success.

The method which I have described in my application Serial No. 85,702 of making the several colour printings by photo-mechanical means has the effect of sweeping away all these difficulties, and reducing the twenty-seven operations to three, which are entirely mechanical, and can, by means of coupled-up machines, be reduced to one combined mechanical operation.

Should a higher quality of photographic image be desired than this photo-mechanical process will give, I have also described in my co-pending application Serial Number 309,373, filed July 8, 1919, how one print (for example the blue) may be printed by photo-chemical means (such as cyanotype or toned silver, or carbon, or pinatype) which will yield a very sharp, clear, transparent image in blue, upon which are superimposed further images such as red and yellow by photo-mechanical printing.

I am in accordance with this invention able to produce a series of reconstructed kinematograph images cheaply, without showing the pattern of the original screen film, without mask to reduce the transparency, without lens-displacement, and without subject-displacement.

"Multi-colour-screen photography" is to be defined for the purpose of the present invention as the method described under the heading "Screen plate photography" in an article commencing on p. 468 of Cassell's Cyclopædia of Photography, published in the year 1912, also in "Farbenphotographie mit Farbraster Platten", by Dr. Mebes, published in 1911 by Fernbach of Bunzlau.

I take original camera pictures in ordinary manner in succession longitudinally of the film upon a sensitized film prepared with colour lines or dots in any of the ways known as screen plate colour photography, through a single lens or objective, and a negative or positive is produced by the ordinary photographic methods used for such colour photography such resulting picture being hereafter referred to as the original picture film.

From this original picture film of the multi-colour-screen type I prepare by reproduction a set of analyzed clichés, either of negative or positive character, according to requirements of the subsequent printing process, one separate single-colour reproduction from each corresponding colour of the multi-colour original, and in the process of reproduction I obliterate the dot, line or screen pattern of the original from the reproduced analyzed cliché so that it is formed with full-tone screenless images free from pattern and extending over the whole area.

The colours of the original are analyzed or separated out for the reproduced clichés and the screen pattern is obliterated by any of the following methods, some of which are old and well known for ordinary (or non-kinematographic) photography.

Where the original picture film is taken upon a multi-colour-screen film, composed of parallel coloured lines (for example red, green, and blue, when there are three colours, and blue-green and orange-red when there are two colours), in regular sequence over the picture area each screen through which the clichés are prepared comprises opaque lines with transparent spaces, each opaque line being in the case of a three colour system of such a width as to cover two colour lines on the original picture film, while the next adjacent transparent space leaves uncovered or unmasked the third colour-line on the original, one colour element of the original picture film being thus unmasked and visible throughout say for instance the red lines. A contact or camera impression is now made on the sensitive surface preferably a surface that is specially sensitive to the red which will involve the red lines, but this impression or image will be imperfect as only covering one third the area of the sensitive surface. To remedy this and completely cover the whole area of the sensitive surface there must be two appropriate shiftings of the screen and the original on the one hand or of the sensitive surface on the other hand, so that the impression line is repeated twice on the blank part of the sensitive surface, and thus the sensitive surface is filled or completely covered with one elemental picture of the trichrome system. The appropriate shiftings are as follows:—

The original and the line screen which is in contact therewith, and which masks two lines out of three of the original, are together advanced in a direction normal to the lines and to a degree or equal to the width of one original colour line, or to express it otherwise, equal to the width of a transparent space of the masking screen. An exposure being now made, one half of the blank space on the sensitive surface is covered and by another similar movement of the original and the masking screen conjointly and a third exposure the whole of the sensitive surface becomes covered and an image is obtained of one colour element of the original picture film. In the case of an original on a two colour system, the masking screen must have equal lines and spaces, and further but one shift is required. Alternatively the sensitive surface may be similarly moved two steps, each step being the width of a line as depicted thereon; an exposure being made after each shift. One colour element having been thus analyzed out or depicted on a separate cliché, the two remaining colour-elements are analyzed out in a similar manner each on a separate cliché. These separate analyzed clichés may be used each to produce other printing clichés or printing belts as described in application Serial No. 85,702.

Thus from the original screen plate picture film are obtained the desired number (say three) single colour printing clichés or belts, each representing or corresponding to one colour section or element of the original picture, and of either negative or positive character as desired.

If the above described process of three part reproduction (or alternatively two part reproduction) be carried out with strict exactness each reproduction will be a smooth and even picture without any line effect, but in practice some lines may partially overlap and others may partially miss thus producing an irregular lined effect. To minimize this defect two courses are available one being to use a masking screen the broad opaque lines of which are somewhat vignetted or weakened at the edges, and another course is to repeatedly vary or alter the course or direction of the light during exposure as to produce such diffusion as is allowed by the thickness of the images or parts or screen, or this thickness may be supplemented by the interposition between the original and the masking screen of a thin film of celluloid or the like.

When the colour screen in the original picture film is composed of slightly curved lines of equal width the above described method of analyzing out each elemental colour in the production of the several clichés will apply.

When the colour screen in the original picture film is composed of or plotted out in complex geometric pattern of lines of unequal width or of intermingled lines and squares or rhomboids, as for example, such screens as are shown by Figures II, III, V and VI of Tafel of Dr. Mebes' book, mentioned above, the method of repeatedly shifting the masking screen in the preparation of the several clichés applies less completely and recourse should be had to extension of the area of illumination by repeatedly altering or varying the course or direction of the light during exposure.

When the colour screen in the original picture film is composed of random or mixed dots of colour such as produced by coloured grains of starch or gelatine, an intermediate masking screen is not required in producing the several clichés but for producing each cliché a colour filter is interposed which will (as in an ordinary case of three colour work) absorb two of the colours and permit only one colour to pass and be impressed upon the cliché. During printing, to obtain an extension of each starch grain or colour unit to eliminate the original screen grain, the light may be shifted, such for instance as around a line normal to the middle point of the original. A distance piece of thin transparent film is preferably interposed between the original picture film and the cliché to allow the diffusion of light. This transparent film may be of corrugated or crimped celluloid formed by flowing the celluloid on to a finely grooved or lined plate. It should be understood that the colour screens and the general procedure should be in accord with the general principles, methods and instructions in standard works on three part or multiple part heliochromy, among which works may be mentioned "Three Colour Photography" by Mon. Hubl, translated by Klein and published by Penrose & Co.

In preparing the clichés of the several individual elemental colours two or more of such clichés may be made from each, one lightly exposed for the dense parts and the other fully exposed for the lighter tones. By making superimposed prints from each of these clichés in succession a longer scale of gradation is obtained and desirable or special effects for harmonizing harshness or other defects becomes practicable. Or one of such clichés may be used directly or indirectly for printing say a light shade or tone of blue or a greenish blue; and another for printing a deep blue or a purple blue, to give better effect to the colours in the picture. This mode of operation is regarded as of special importance in relation to originals produced by the two-colour process.

In this way 6 or 9 colours or printings can be obtained from a three colour original and 4 or 6 colours or printings from a two colour original.

The original picture film is perforated in the ordinary way, and the intermediate analyzed clichés, the photo-mechanical printing clichés belts, and the final film to be printed, are also perforated to correspond, so that registration for each may be accurately effected by means of registering pins on the printing apparatus which engage the several perforations in exact register. If the film is to be printed by a photo-mechanical process the analyzed clichés become merely intermediate means for producing photo-mechanical clichés or printing belts, which are prepared for example by the methods described in my application Serial No. 85702. The machinery to be used for making the prints is of any known form suitable for the particular printing process adopted.

The accompanying drawings show diagrammatically the preferred mode of carrying the invention into effect.

Figure 1 is a diagrammatic view in section showing the mode of making the original picture film;

Figures 2, 3 and 4 show diagrammatically and in section the mode of making each analyzed cliché;

Figures 5, 6 and 7 represent diagrammatically, parts of the images borne by the respective clichés for the projection of three-color pictures;

Figures 5ª, 6ª and 7ª represent diagrammatically sections through the clichés represented in Figures 5, 6 and 7 respectively;

Figures 8, 9 and 10 show diagrammatically and in section the mode of printing upon a printing belt from each of the clinchés;

Figures 11, 12 and 13 show diagrammatically and in section the mode of printing the final kinematograph film in different colors from the different clichés, and Figure 14 is a view of the final kinematograph film printed in three-colors.

By referring to Figure 1, it will be observed that the original picture film 1 is produced by exposing a suitably sensitized surface 2 carried by an appropriate base 3, through the camera lens 4 and behind a multi-color screen 5. The original picture film 1 is then used to produce the intermediate clichés A, B and C which may correspond respectively with the red, blue and green portions of the images. The original picture film is placed in contact with a suitably sensitized surface 6 carried by a suitable base 7 and a line screen 8 is placed in contact with the original picture film 1, the line screen having lines thereon of a width sufficient to cover two lines produced on the original picture film, and while the parts described are positioned as shown in Figure 2, an exposure is made through the line screen and the original picture film onto the sensitized surface 6, from a source of light 9. After this exposure has been made, the line screen and the original picture film are again shifted relatively to the sensitized surface 6 for a distance equal to the thickness of one line on the original picture film, whereupon a three-exposure is made upon the sensitized surface 6, the position occupied by the parts during this exposure being represented in Figure 4. Each cliché corresponding to one color of the picture is made by the method just described, the parts of the image borne by the different clichés being represented in Figures 5, 6 and 7 respectively.

The printing belts from which the final kinematograph film is produced are made in the manner shown in Figures 8, 9 and 10, the printing belt being composed of a suitable base 10 having a sensitive resist 11 thereon and a contact print being made upon the belt successively from each of the clichés A, B and C, there being one belt thus produced from each cliché for each color of the final picture.

The final kinematograph film is printed from the printing belts by successive impressions thereon and these impressions may be made upon any suitable flexible base 12, Figure 11 showing the cliché A in position to apply its impression upon the film, Figure 12 showing the cliché B in position to apply its impression thereon and Figure 13 showing the cliché C in position to apply its impression thereon. The final kinematograph film 12, as shown in Figure 14, will bear pictures, the sections a, b and c of which are in different colors and correspond to the impressions received from the clichés A, B and C respectively. It will be understood that the clichés, the printing belt and also the base to compose the final kinematograph film are provided with perforations along their edges to cooperate with sprocket teeth, pins or other suitable devices to insure correct registration during the exposing and printing operations.

What I claim as my invention and desire to protect by Letters Patent is:—

1. A process for producing kinematograph heliochrome positive films, bearing series of pictures in natural colours, with the whole of the colours formed upon a single-width perforated film, capable of fitting any ordinary projector designed for monochrome film, and working with the same intensity of light; such film being produced without the defects of lens-displacement (parallax) or subject displacement (movement), and also being without visible colour-screen pattern or mosaic, and also without a blocking-out mask to interfere with transparency; the said process consisting in taking the original heliochrome or camera picture upon a single-width multi-colour-screen film; then making therefrom full-tone patternless reproductions in the form of analyzed printing clichés—a separate cliché for each colour, shade, or section; preparing printing belts from the respective cliché and finally producing the pictures in reconstructed form as colour positives upon single-width perforated film, by printing from each prepared printing cliché in a different colour, the printings being superimposed one upon the other, by any suitable printing process; the cliché images being either negative or positive according to the printing process adopted; and accurate register being secured by coincident perforations in the original, said analyzed and printing clichés, and the blank film to be printed, and by register pins engaging with such perforations substantially as desired.

2. The method of production of kinematograph heliochrome positive films by superimposed printing processes from heliochrome originals made by the multi-colour-screen process, by a system of transposition which consists in first making a set of intermediary analyzed single-colour reproduced clichés of full-tone character for each color and shade of color, without dots, lines, mosaic or other pattern, and with the images extending over the whole area of each picture by shifting the screen through which they are reproduced; and producing therefrom printing clichés, to be used for printing the final positive film prints.

3. In the production of heliochrome kinematograph positive films by superimposed printing processes from multi-colour screen originals, the method of obliterating the grains, dots, lines, mosaic, or other pattern from the final positive which comprises reproducing therefrom through screens intermediate clichés from which such pattern is deleted during the process of making such intermediate clichés by shifting the screen as often as required.

4. A complete kinematograph heliochrome positive film of the superimposed type, containing a plurality of layers of ink of different colours, modified colours, and shades exceeding those in the original camera heliochrome picture film, substantially as described.

5. The herein described process of forming a plurality of heliochromatic positive pictures longitudinally of the film upon continuous kinematographic films, each picture being a complete heliochrome, which process comprises taking the original picture film by the multi-color screen plate method through a single lens, longitudinally of the film, analyzing out the elements of each heliochrome original picture by the interposition of line screens, shifting the line screens during the process, and printing from said elements, serving as printing belts, multi-color superimposed pictures in succession longitudinally of continuous positive films.

6. Multi-color kinematograph films having the pictures in succession longitudinally thereon, comprising a transparent perforated base and a plurality of superimposed impressions of the pictures thereon, each impression comprising a layer of applied ink in different colors from which the screen markings have been eliminated.

7. In the production of multi-color kinematograph films, the method of analyzing the colors from a single screen plate original picture film, which consists in printing from the original picture film through a screen onto a sensitized surface, and moving the screen and printing a second impression, and so on for each color, to produce clichés of each separate color without screen markings.

8. The herein described method of producing multi-color kinematograph films, which comprises photographing the original pictures in succession longitudinally of the film and upon a multi-color screen film, producing from this original picture film a plurality of intermediate clichés, each in a single color and each differing from the other by printing from the original picture film onto a sensitized surface through a screen and moving such screen during the printing process to obliterate the screen markings of the original picture film, preparing printing clichés from the intermediate clichés, and finally printing the kinematograph film from each of the printing clichés in succession, one impression superimposed on another.

In testimony whereof I have hereunto set my hand in presence of two subscribing witnesses.

JOHN EDWARD THORNTON.

Witnesses:
J. OWDEN O'BRIEN,
W. J. A. NORSWATHY.